3 Sheets—Sheet 1.

J. P. TIRRELL,

Assignor, by mesne assignments, to FRANKLIN ELECTRIC GAS LIGHTING CO.

Electrical Apparatus for Lighting Street Lamps, &c.

No. 9,743. Reissued June 7, 1881.

Witnesses.
R. J. Van Doskerck
E. C. Simonson

Inventor.
Jacob P. Tirrell
per
Frost & Coe
Attorneys

3 Sheets—Sheet 2.

J. P. TIRRELL,

Assignor, by mesne assignments, to FRANKLIN ELECTRIC GAS LIGHTING CO.

Electrical Apparatus for Lighting Street Lamps, &c.

No. 9,743. Reissued June 7, 1881.

Witnesses.
R. J. Van Rosskerck
E. C. Simonson

Inventor.
Jacob P. Tirrell
per Street & Coe
Attorneys

J. P. TIRRELL,

Assignor, by mesne assignments, to FRANKLIN ELECTRIC GAS LIGHTING CO.

Electrical Apparatus for Lighting Street Lamps, &c.

No. 9,743. Reissued June 7, 1881.

Witnesses.
R. D. Van Loskerck
E. C. Simonson

Inventor
Jacob P. Tirrell
per
Frost & Coe
Attorneys

UNITED STATES PATENT OFFICE.

JACOB P. TIRRELL, OF WEST SOMERVILLE, ASSIGNOR, BY MESNE ASSIGNMENTS, TO FRANKLIN ELECTRIC GAS LIGHTING COMPANY, OF BOSTON, MASSACHUSETTS.

ELECTRICAL APPARATUS FOR LIGHTING STREET-LAMPS, &c.

SPECIFICATION forming part of Reissued Letters Patent No. 9,743, dated June 7, 1881.

Original No. 130,770, dated August 20, 1872. Application for reissue filed February 21, 1881.

*To all whom it may concern:*

Be it known that I, JACOB P. TIRRELL, a citizen of the United States, residing in West Somerville, in the county of Middlesex and State of Massachusetts, have invented certain new and useful Improvements in Electrical Apparatus for Lighting Street-Lamps, &c., and I do hereby declare that the following is a full, clear, and exact description of the same, reference being had to the accompanying plates of drawings.

This invention relates to that class of electrical apparatus for lighting street-lamps in which the current is successively thrown into the magnet at each burner one after another; and under this invention the circuit-breaker is located at the burner, and, by the direct action of the current through the magnet located at the burner, the circuit-breaker and the valve to let on or turn off the gas are both operated, and the current, after the opening or closing, as the case may be, of the valve to one burner, is completely cut off from the magnet of such burner and thrown into the magnet of next burner, and so on.

In the accompanying plates of drawings the present invention is illustrated.

Figure 1:
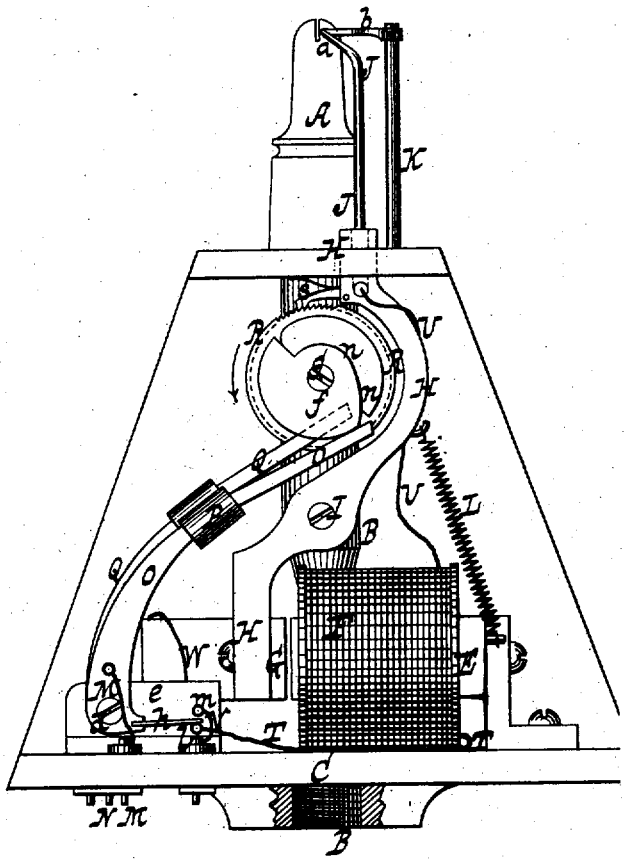
Figure 2:
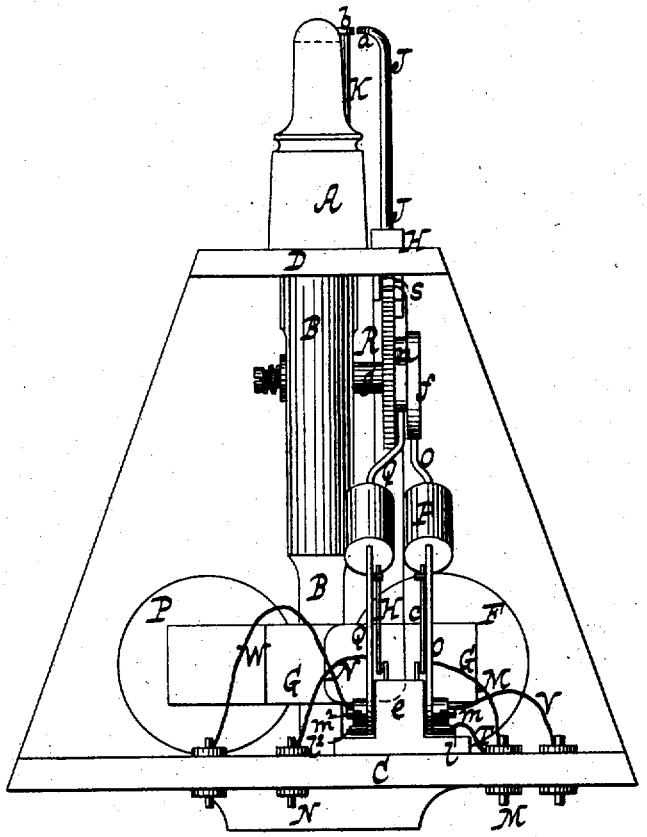
Figure 4:
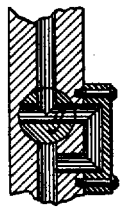
Figure 5:
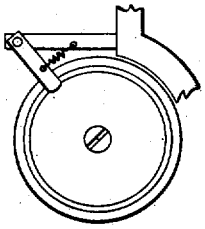
Figure 3:
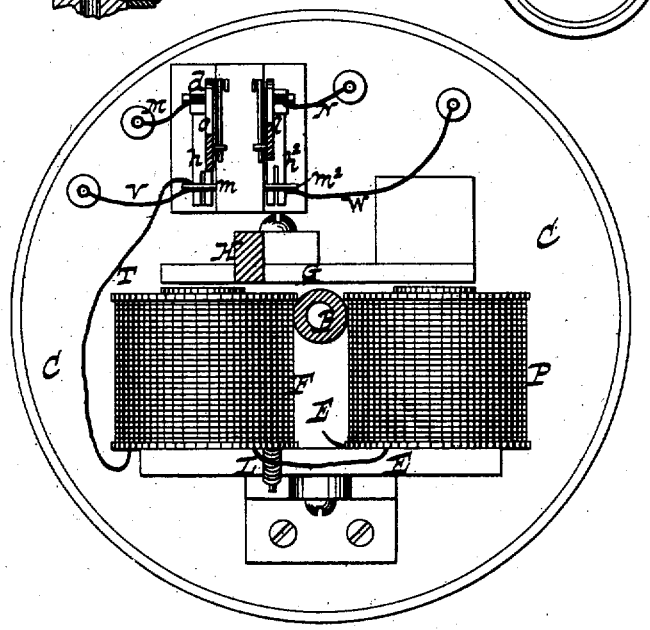

In Plates 1 and 2, Figures 1 and 2 are elevations from different sides. In Plate 3, Fig. 3 is a partial plan view and horizontal section; Figs. 4 and 5, detailed views.

A in the drawings represents a gas-burner, to which B is the feed-pipe provided with two horizontal platforms, C and D, for carrying the apparatus of this invention; E, a U-magnet, horizontally located and secured on the lower platform, C, with the pipe B in and between the legs F of the magnet; G, the armature, properly located with regard to the magnet E and secured to the lower end of an upright lever, H, turning upon a fulcrum at I of the feed-pipe B; J, the circuit-breaker, secured to the upper end of the lever H and projecting upward to the plane of the escape of the gas from the burner; K, a post in upper platform, D, and in electrical connection with the earth.

At the upper end of the post K is a horizontal platinum arm, *b*, against which rests the point *a* of the circuit-breaker J when the lever H is at rest; L, a spiral spring applied to lever H, to throw back the armature G from the magnet E; O, an upright arm. This arm O, at its lower end, is hung upon a fulcrum, *d*, of an insulator-block, *e*, on platform C, and at its upper end it is in a position to bear against the periphery of a sector-wheel, *f*, fixed to the spindle *g* of valve in gas-pipe B; C, a bent spring applied to arm O to hold it against the sector-wheel *f*, and, when escaping from the periphery thereof, to swing it on its fulcrum. The arm O at P, between its two ends, is insulated.

*h* is a finger-piece projecting horizontally from lower end of arm O. This finger-piece *h*, at its outer end, lies in a position between the two pins *l* and *m*, projecting horizontally one above the other from the block *e*. The lower pin, *l*, extends wholly through the block *e*, and similarly projects therefrom from its other side, being there lettered as $l^2$. The upper pin, *m*, only enters the block; but on the opposite side of the block thereto a similar pin, $m^2$, is located, also only entering the block.

Q is an arm similarly constructed, arranged, and hung on the block *e* to the arm O. This arm Q is in position to bear upon the periphery of a sector-wheel, *n*, fixed to the gas-valve spindle *g*, and for its finger-piece $h^2$ to lie in and between the projecting pins $l^2$ and $m^2$ of the block *e*. The sector-wheel *n* is back of the sector-wheel *f*. The two sector-wheels *f* and *n* are of equal diameter, of an equal length of arc—that is, a half of a circle. The two together complete the circumference. The relative location of the sector-wheels *f* and *n* on the valve-spindle is such that with the arm O on the periphery of the sector-wheel *f* the arm Q will be off the periphery of its sector-wheel *n*, and vice versa, and the purpose of the said sector-wheels is to turn their respective arms O Q, so as to bring about a bearing between their respective finger-pieces $h\,h^2$ and the lower pins, $l\,l^2$, and also to allow the springs applied to the said arms O Q to react and bring their finger-pieces into contact with the upper pins, $m\,m^2$.

R is a ratchet-wheel secured to gas-valve spindle back of inner sector-wheel, *n*; and S a spring-pawl hung to lever H, and arranged from the movement of such lever to act upon the ratchet-wheel R to turn it in the direction of the arrow, Fig. 1, Plate 1. In lieu of a ratchet-wheel, a friction-wheel and clutch may be employed, such as shown in Fig. 5.

M and N are wires leading from the electric battery employed. The wire M is to let on, and the wire N to shut off, the gas at the burner A. The current is thrown into the one or the other of said wires by means of a double switch, such as is employed ordinarily in electrical gas-lighting apparatus, and therefore needs no particular description herein. The wire M connects with the arm O, and the wire N with the arm Q.

T is a wire connecting lower pin, *l*, with magnet E, and U a wire connecting magnet with circuit-breaker J.

V and W are wires respectively connected with upper pins, *m* and $m^2$, from which they are to lead to the next burner, and to such burner become the letting-on and turning-off wires, as the wires M and N to the burner A.

The position of the several parts composing the mechanism hereinabove described is at all times, if at rest, substantially that shown in Fig. 1, Plate 1, and only differs therefrom in any condition of rest in the relative positions of the two arms O Q, according as one or the other is bearing on its respective sector-wheel, *f* or *n*. By the shown positions of the two arms O and Q the finger-piece *h* of the arm O is against the lower pin, *l*, and the finger-piece $h^2$ of arm Q against the upper pin, $m^2$, of block *e*. This relative contact with the pins $l$ $l^2$ $m$ $m^2$ of the finger-pieces to the two arms is always maintained, they never being both at the same time in contact with the lower pins, $l$ $l^2$, or the upper pins, $m$ $m^2$, but always the one with a lower pin and the other with an upper pin alternately. If, now, with the arms O and Q in the relative positions described and shown, a current of electricity be thrown into the wire M (which, as stated, is the letting-on wire,) it is obvious it will pass into the magnet, (the connection being through arm O, finger-piece *h*, pin *l*, and wire T,) thence to the circuit-breaker J; and then, as the circuit is complete, the armature G will be drawn toward the magnet, turning its lever H on its fulcrum, which carries the circuit-breaker J beyond the end of the platinum arm *b*, breaking thereby the circuit and emitting an electric spark. This breaking of the circuit destroys the attractive force of the magnet, and leaves the lever H to be pulled backward by the spring L, which backward movement of the lever completes the circuit by bringing the circuit-breaker into contact with the platinum arm *b*, when another attraction of the armature G occurs, again breaking the circuit, emitting a spark, and so on, as before. By this alternate forward and backward movement of the lever H the ratchet-wheel R on gas-valve spindle is intermittently rotated, carrying with it the valve-spindle *g* and sector-wheels *f* *n*. If this rotation of the valve spindle *g* be continued sufficiently, the periphery of the sector-wheel *f* will be carried beyond the arm O, leaving it free for its spring to act upon it, and thus to throw its finger-piece *h* out of contact with the lower pin, *l*, and into contact with the upper pin, *m*, and the periphery of the sector-wheel *n* will be brought to bear upon the arm Q, throwing its finger-piece $h^2$ out of contact with the upper pin, $m^2$, and into contact with the lower pin, $l^2$.

With the movement of the sector-wheel *f* beyond its arm O and of the sector-wheel *n* onto its arm Q, as above described, results have been effected as follows: First, the gas valve or stop-cock has been opened to its fullest extent, and as at each stroke of the lever H caused by the successive attraction of the armature the circuit was broken and a spark emitted, it is obvious that the gas necessarily must have been lighted; second, the current of electricity through wire M is cut off from the magnet E and thrown into the wire V leading to the magnet of the next burner, and which, as before stated, is the letting-on wire to such burner; third, a connection has been established between the magnet E and the shutting-off wire N, so that when desired to shut off the gas from the burner A the operator has only to make the necessary connection between battery and shutting-off wire. The connection between the shutting-off wire N and the magnet is through arm Q, its finger-piece $h^2$, pin $l^2$, and wire T.

In shutting off the gas at the burner the operation of the parts is precisely similar to the letting on of the gas, and therefore needs no particular description; and on its completion the arm Q escapes from its sector-wheel *n*, and the arm O passes onto its sector-wheel *f*, re-establishing the connection between letting-on wire and magnet, as before. Completing the shutting off of the gas at one burner throws the current into the wire W leading from such burner A to the next burner, which wire W to the said next burner is the shutting-off wire.

In Fig. 4 the valve in gas-pipe is shown in detail, and is such that in a half-turn of the spindle *g* the gas will be let on, and, continuing the turn, shut off.

The location of the circuit-breaker at the gas-burner is such that as it breaks the circuit by escaping from the platinum arm *b* the spark emitted will be sufficiently near to the escaping gas to ignite the same, and it is desirable that the movement to let on the gas should be so divided as to emit a sufficient number of sparks to insure the lighting of the gas.

I do not claim turning on and off the gas by means of a step-by-step motion, as such is not my invention.

Having thus described my invention, what I claim is as follows:

1. In an apparatus for lighting gss by electricity, the combination of two wires through which currents of electricity are passed, an electro-magnet electrically connected therewith and attracting an armature which actuates mechanism, substantially as described, for automatically turning on the gas and lighting the same by an electric spark at the tip of the gas-burner, and also for turning off the gas to extinguish the light, substantially as described.

2. In an apparatus for lighting gas by electricity, the helix of an electro-magnet connected at one end with the wire through which the current of electricity is passed, and at the other end with a circuit-breaker located at the gas-burner, so arranged that the current of electricity is passed to the circuit-breaker through said magnet, attracting an armature-actuating mechanism operating automatically to turn on the gas and light the same by the effects of the primary sparks made at the tip of the burner from said magnet in the circuit.

3. The arms O Q, sector-wheel *f n*, pins *l* $l^2$ *m* $m^2$, wires M N, magnet E, lever H, carrying armature G, circuit-breaker J, and pawl S, and the ratchet-wheel, all combined and arranged together and applied to a gas-burner for operation, substantially as and for the purposes set forth.

4. In an apparatus for lighting gas by electricity, in combination with a circuit-breaker located at the gas-burner, a lever adapted and arranged to open and close the stop-cock or valve of the burner, and carrying the circuit-breaker, substantially as herein described.

5. In an apparatus for lighting gas by electricity, the combination of a wire through which a current of electricity is passed, actuating mechanism for letting on the gas, an electro-magnet electrically connected with said wire, an armature operated by said electro-magnet, mechanism actuated by said armature, breaking the circuit at the burner-tip, and producing there an electric spark or sparks for lighting the gas, the whole operating automatically.

6. In an apparatus for lighting gas by electricity, the combination of two wires through which currents of electricity are passed, actuating mechanism for both letting on and turning off the gas by substantially the same means, an electro-magnet electrically connected with said wires, an armature operated by said electro-magnet, mechanism actuated by said armature for breaking the circuit at the burner-tip, and producing there the spark or sparks for lighting the gas, the whole operating automatically, substantially as described.

In witness whereof I have hereunto set my hand this 11th day of February, A. D., 1881.

JACOB P. TIRRELL.

In presence of—
A. B. HALL,
CHAS. T. GAY.